(12) United States Patent
Rahman et al.

(10) Patent No.: US 11,063,644 B2
(45) Date of Patent: Jul. 13, 2021

(54) METHOD AND APPARATUS FOR CONTROL SIGNALING FOR MULTI-STREAM TRANSMISSION

(71) Applicant: Samsung Electronics Co., Ltd., Suwon-si (KR)

(72) Inventors: Md Saifur Rahman, Plano, TX (US); Eko Onggosanusi, Coppell, TX (US); Li Guo, Allen, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 15/940,631

(22) Filed: Mar. 29, 2018

(65) Prior Publication Data

US 2018/0294857 A1 Oct. 11, 2018

Related U.S. Application Data

(60) Provisional application No. 62/481,807, filed on Apr. 5, 2017, provisional application No. 62/485,184, filed on Apr. 13, 2017.

(51) Int. Cl.
| | |
|---|---|
| *H04B 7/0456* | (2017.01) |
| *H04L 29/06* | (2006.01) |
| *G06F 21/62* | (2013.01) |

(52) U.S. Cl.
CPC ........... *H04B 7/0473* (2013.01); *G06F 21/62* (2013.01); *H04L 63/083* (2013.01)

(58) Field of Classification Search
CPC ..... H04B 7/0473; G06F 21/62; H04L 63/083; H04L 1/1896; H04L 1/0079; H04L 1/06; H04L 1/0075
See application file for complete search history.

(56) References Cited

U.S. PATENT DOCUMENTS

| | | | |
|---|---|---|---|
| 2013/0235838 | A1 | 9/2013 | Kim et al. |
| 2014/0245094 | A1 | 8/2014 | Kotecha et al. |
| 2016/0037524 | A1 | 2/2016 | Krzymien et al. |
| 2019/0327751 | A1* | 10/2019 | Dong ................... H04W 72/042 |

FOREIGN PATENT DOCUMENTS

| | | | |
|---|---|---|---|
| CN | 102469587 B | 8/2015 | |
| CN | 108430106 A | * 8/2018 | ........... H04W 72/042 |

OTHER PUBLICATIONS

Supplementary European Search Report in connection with European Application No. 18781463.7 dated Feb. 21, 2020, 8 pages.
Huawei, et al., "DCI for Rel-10 downlink MIMO," R1-105135, 3GPP TSG RAN WG1 meeting #62bis, Xi'an, China, Oct. 11-15, 2010, 4 pages.

(Continued)

*Primary Examiner* — Justin T Van Roie

(57) ABSTRACT

Methods and apparatuses for control signaling for multi-stream transmission. A method for operating a user equipment (UE) includes receiving a downlink (DL) control information (DCI) signaling and identifying, from the DCI signaling, parameters for a first codeword and an indication of control signaling for parameters for N−1 additional codewords. N is a number of codewords scheduled for the UE and N≥1.

20 Claims, 12 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 14)", Technical Specification 3GPP TS 36.211 V14.1.0, Dec. 2016, 175 pages.
"3rd Generation Partnership Project; Technical Specification Group Radio Access Network; Evolved Universal Terrestrial Radio Access (E-UTRA); Multiplexing and channel coding (Release 14)", Technical Specification 3GPP TS 36.212 V14.1.0, Dec. 2016, 176 pages.
"3rd Generation Partnership Project; Technical Specification Group Radio Access Network; Evolved Universal Terrestrial Radio Access (E-UTRA); Physical layer procedures (Release 14)", Technical Specification 3GPP TS 36.213 V14.1.0, Dec. 2016, 414 pages.
"3rd Generation Partnership Project; Technical Specification Group Radio Access Network; Evolved Universal Terrestrial Radio Access (E-UTRA); Medium Access Control (MAC) protocol specification (Release 14)", Technical Specification 3GPP TS 36.321 V14.1.0, Dec. 2016, 98 pages.
"3rd Generation Partnership Project; Technical Specification Group Radio Access Network; Evolved Universal Terrestrial Radio Access (E-UTRA); Radio Resource Control (RRC); Protocol specification (Release 14)", Technical Specification 3GPP TS 36.331 V14.1.0, Dec. 2016, 654 pages.
"3rd Generation Partnership Project; Technical Specification Group Services and System Aspects; Feasibility Study on New Services and Markets Technology Enablers; Stage 1 (Release 14)", Technical Report 3GPP TR 22.891 V1.2.0, Nov. 2015, 96 pages.
International Search Report dated Jul. 20, 2018 in connection with International Patent Application No. PCT/KR2018/004005.
Written Opinion of the International Searching Authority dated Jul. 20, 2018 in connection with International Patent Application No. PCT/KR2018/004005.
AT&T, "Multi DCI NC-JT Framework", 3GPP TSG RAN WG1 Meeting #88bis, Apr. 3-7, 2017, 3 pages, R1-1704339.
Samsung, "Codeword-to-layer mapping for DL and UL NR MIMO", 3GPP TSG RAN WG1 NR Ad-Hoc, Jan. 16-20, 2017, 7 pages, R1-1700898.

* cited by examiner

METHOD AND APPARATUS FOR CONTROL SIGNALING FOR MULTI-STREAM TRANSMISSION

CROSS-REFERENCE TO RELATED APPLICATION(S) AND CLAIM OF PRIORITY

The present application claims priority to U.S. Provisional Patent Application Ser. No. 62/481,807, filed on Apr. 5, 2017; and U.S. Provisional Patent Application Ser. No. 62/485,184, filed on Apr. 13, 2017. The content of the above-identified patent documents is incorporated herein by reference.

TECHNICAL FIELD

The present disclosure relates generally to multi-stream transmission in wireless communication systems and, more specifically, to downlink (DL) control information (DCI) signaling to schedule N≥1 codewords for DL data reception or uplink (UL) data transmission by the UE in advanced wireless communication systems.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide methods and apparatuses for control signaling for a multi-stream transmission in an advanced wireless communication system.

In one embodiment, a user equipment (UE), is provided. The UE includes a transceiver configured to receive a DCI signaling. The UE also includes a processor operably connected to the transceiver. The processor is configured to identify, from the DCI signaling, parameters for a first codeword and an indication of control signaling for parameters for N−1 additional codewords. N is a number of codewords scheduled for the UE and N≥1.

In another embodiment, a base station (BS) is provided. The BS includes a processor configured to generate parameters for a first codeword and an indication of control signaling for parameters for N−1 additional codewords. The BS also includes a transceiver operably connected to the processor. The transceiver is configured to transmit, to a UE, a DCI signaling including the parameters for the first codeword and the indication of the control signaling for the parameters for the N−1 additional codewords. N is a number of codewords scheduled for the UE and N≥1.

In yet another embodiment, a method for operating a UE is provided. The method includes receiving a DCI signaling and identifying, from the DCI signaling, parameters for a first codeword and an indication of control signaling for parameters for N−1 additional codewords. N is a number of codewords scheduled for the UE and N≥1.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
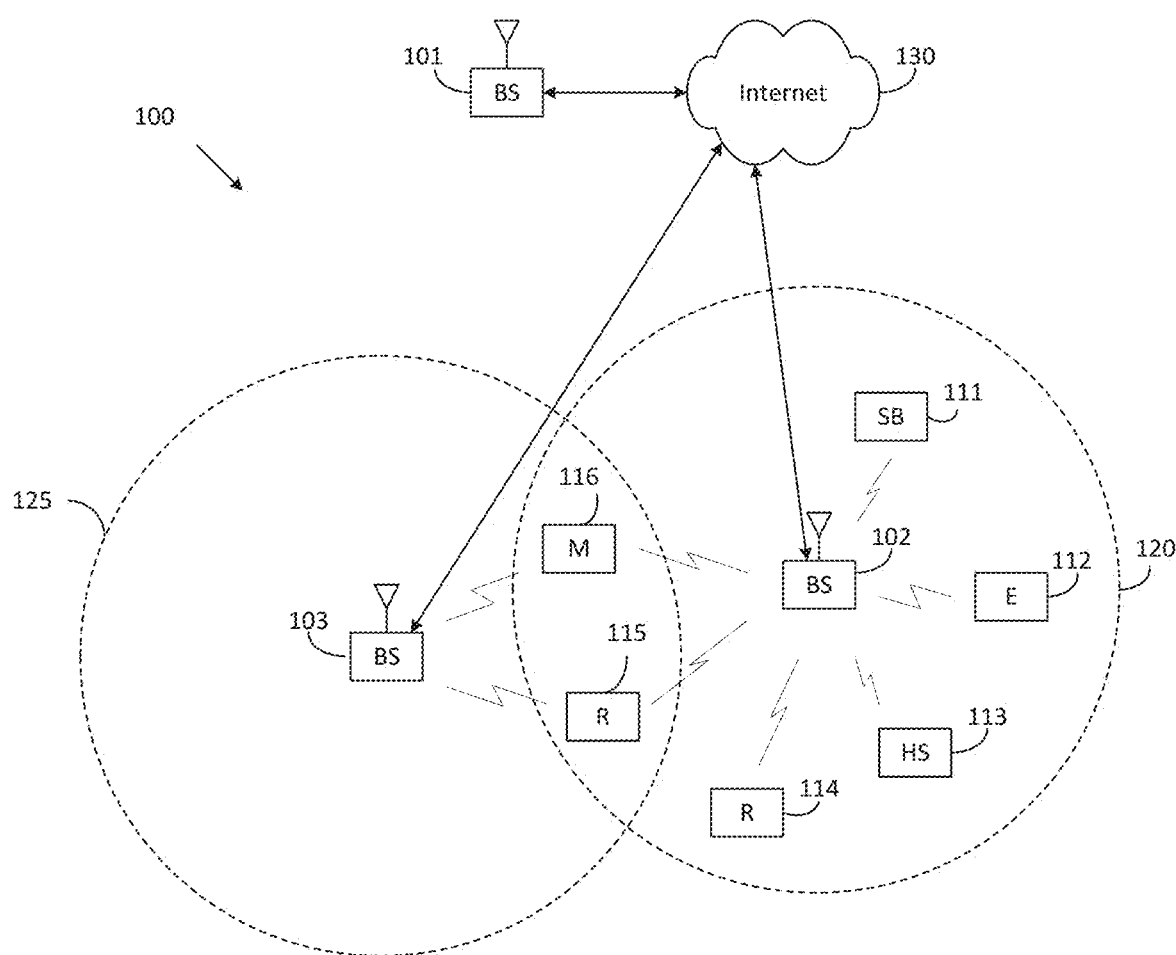
FIG. 1 illustrates an example wireless network according to embodiments of the present disclosure.

FIGS. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.1.0, "E-UTRA, Physical channels and modulation;" 3GPP TS 36.212 v14.1.0, "E-UTRA, Multiplexing and Channel coding;" 3GPP TS 36.213 v14.1.0, "E-UTRA, Physical Layer Procedures;" 3GPP TS 36.321 v14.1.0, "E-UTRA, Medium Access Control (MAC) protocol specification;" 3GPP TS 36.331 v14.1.0, "E-UTRA, Radio Resource Control (RRC) protocol specification" and 3GPP TR 22.891 v1.2.0, "Feasibility Study on New Services and Markets Technology Enablers."

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM).

This disclosure of invention covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
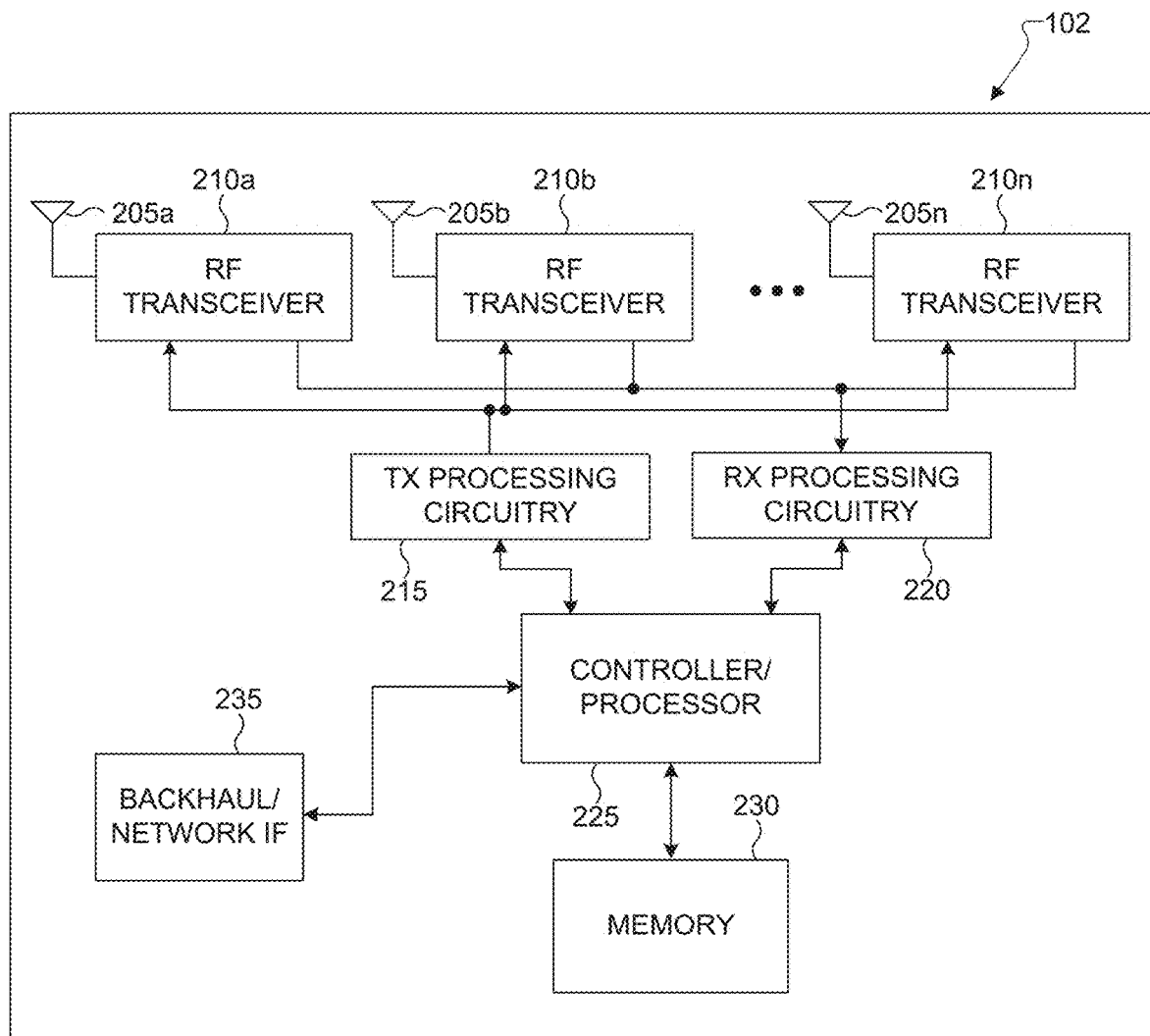
FIG. 2 illustrates an example eNB according to embodiments of the present disclosure.
Figure 3:
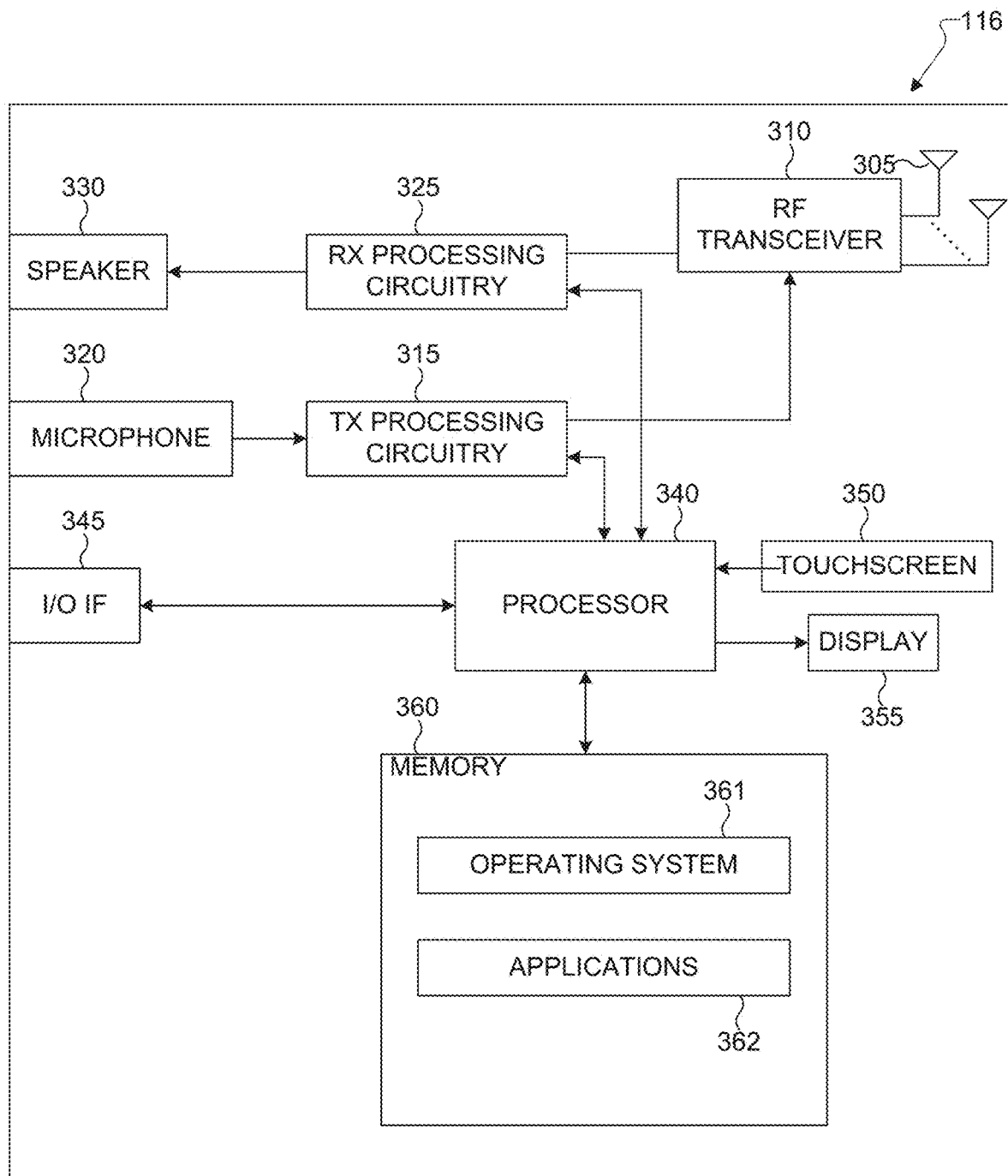
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient covariance matrix feedback in an advanced wireless communication system. In certain embodiments, and one or more of the eNBs 101-103 includes circuitry, programing, or a combination thereof, for receiving efficient covariance matrix feedback in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
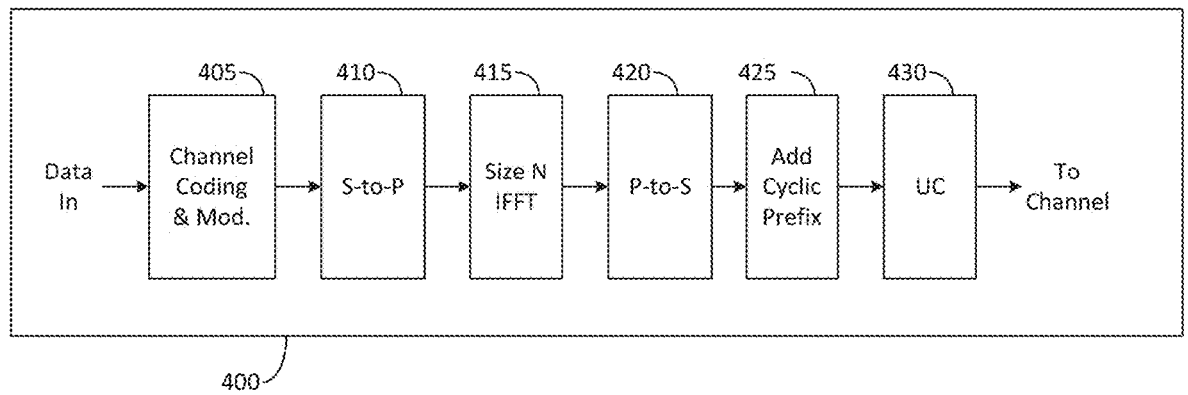
FIG. 4A illustrates a high-level diagram of an orthogonal frequency division multiple access transmit path according to embodiments of the present disclosure.
Figure 4B:
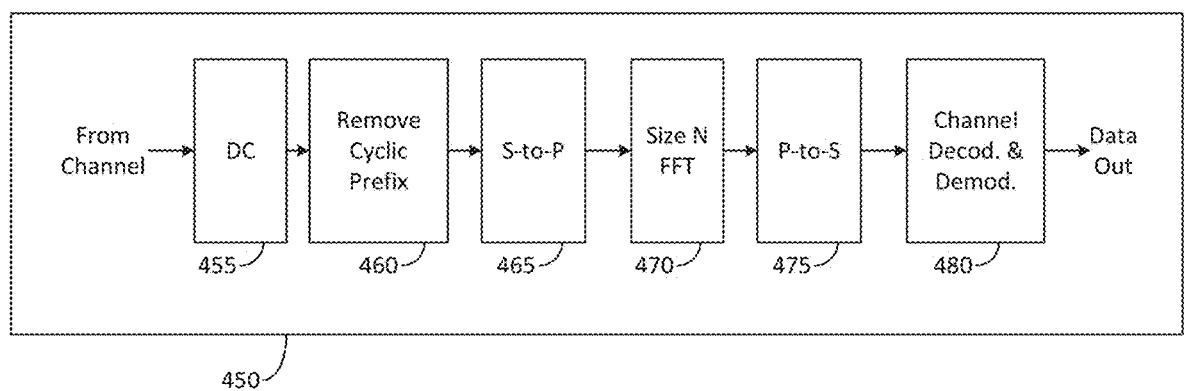
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNB s 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb} = 2 \cdot (N_{symb}^{UL} - 1) - N_{SRS}$, where $N_{SRS}=1$ if a last subframe symbol is used to transmit SRS and $N_{SRS}=0$ otherwise.

Figure 5:
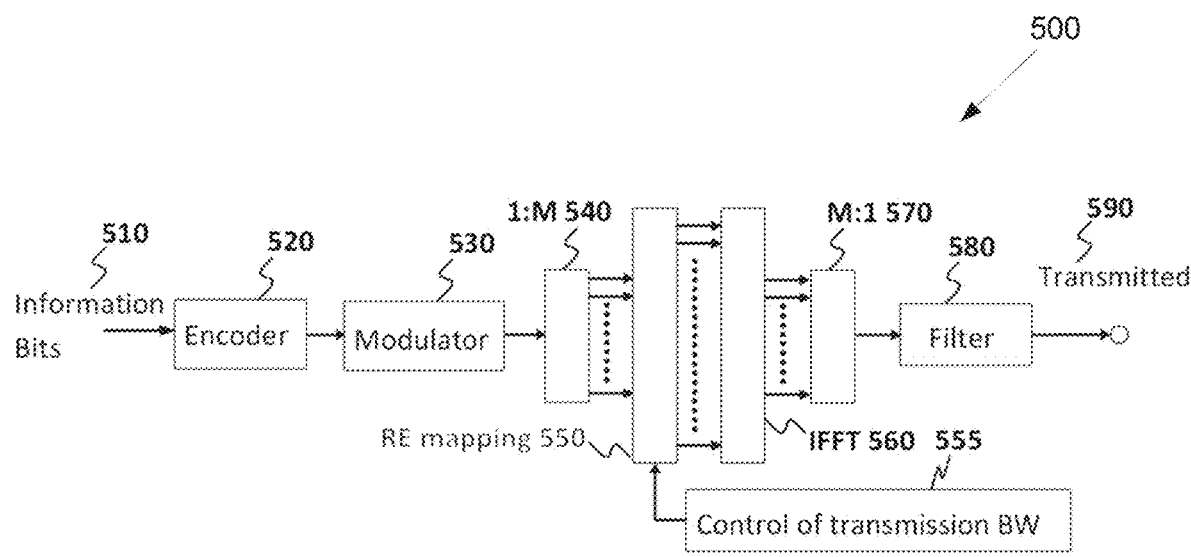
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
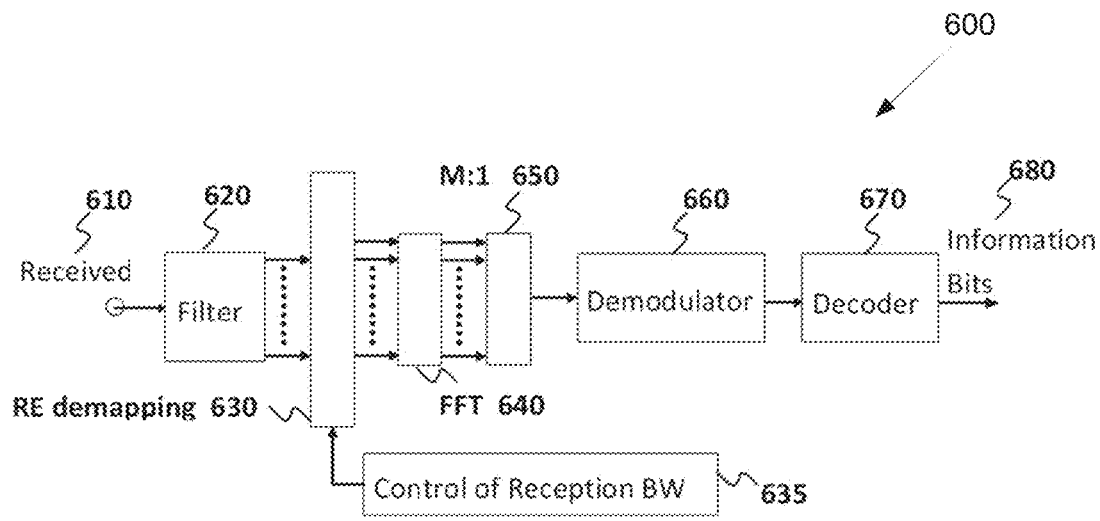
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
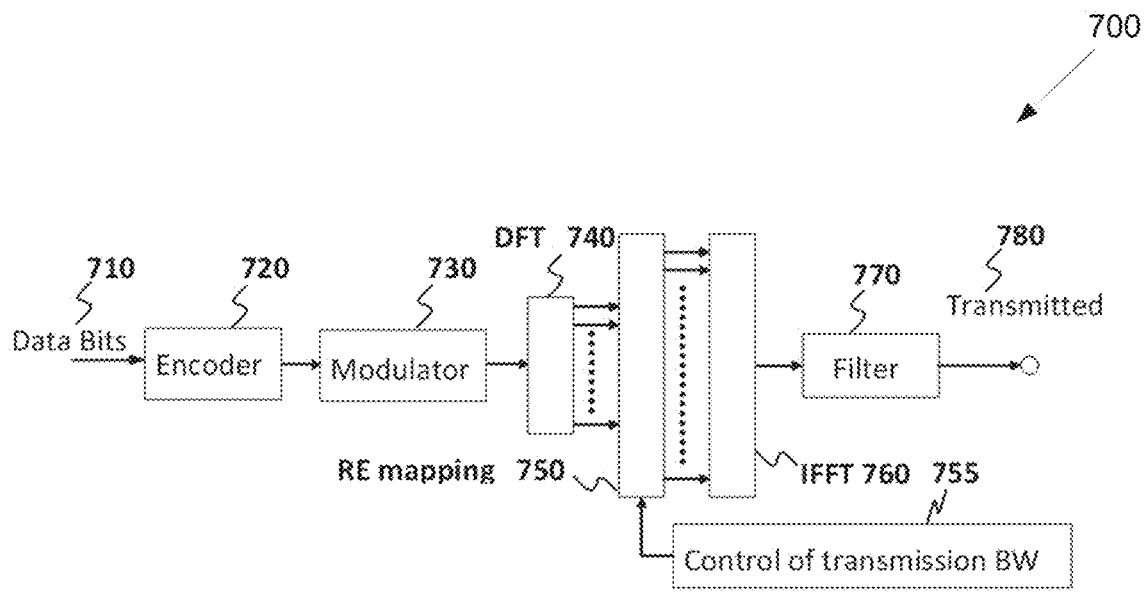
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
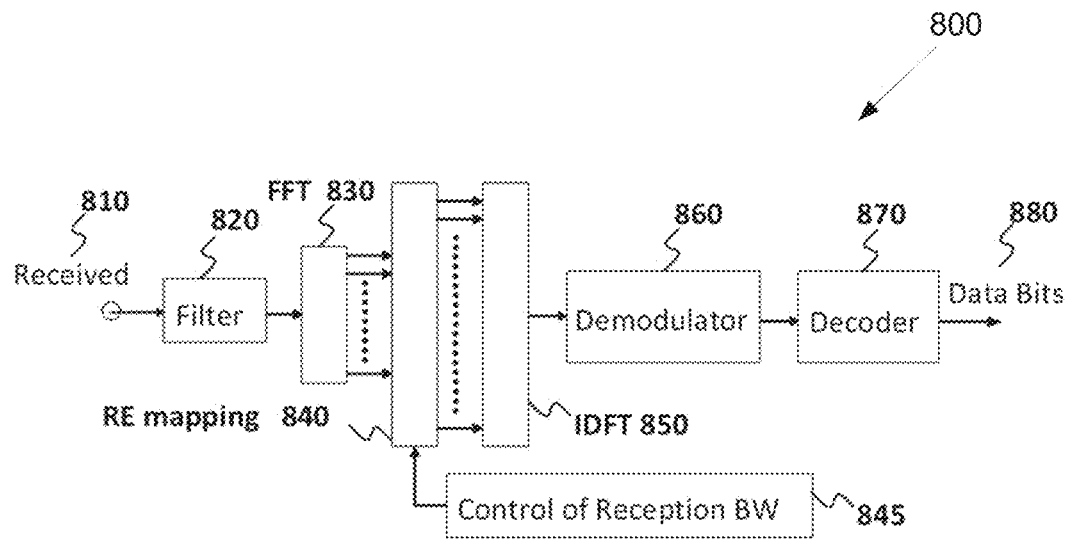
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
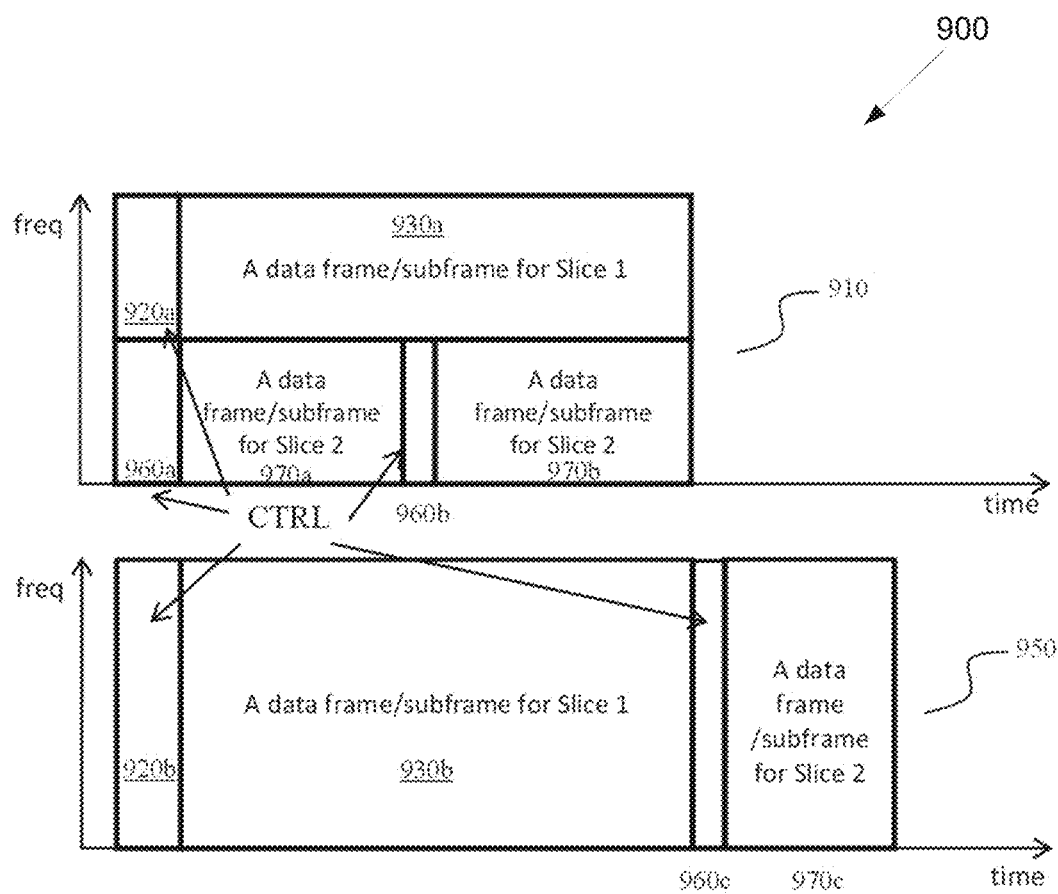
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
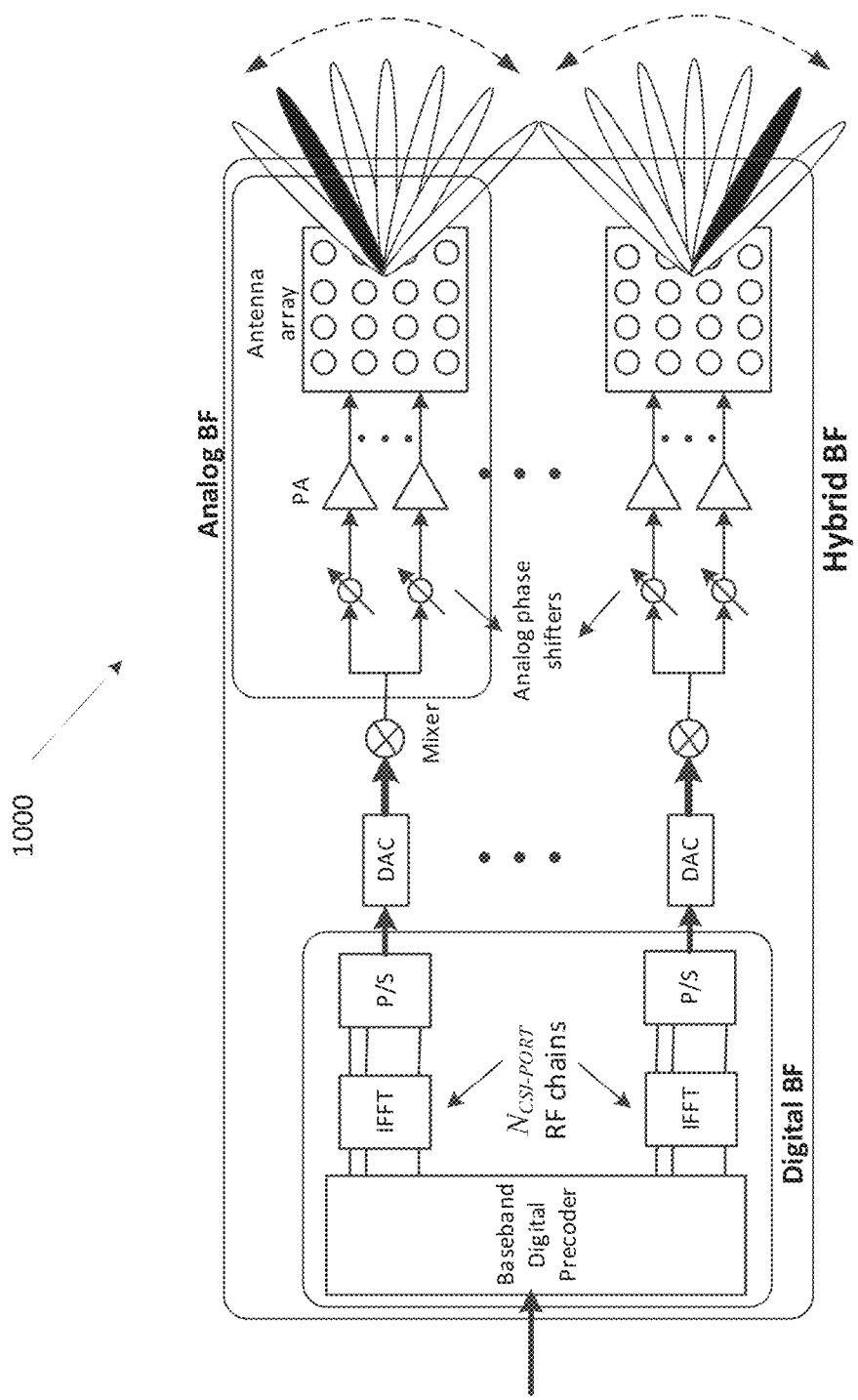
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11A:
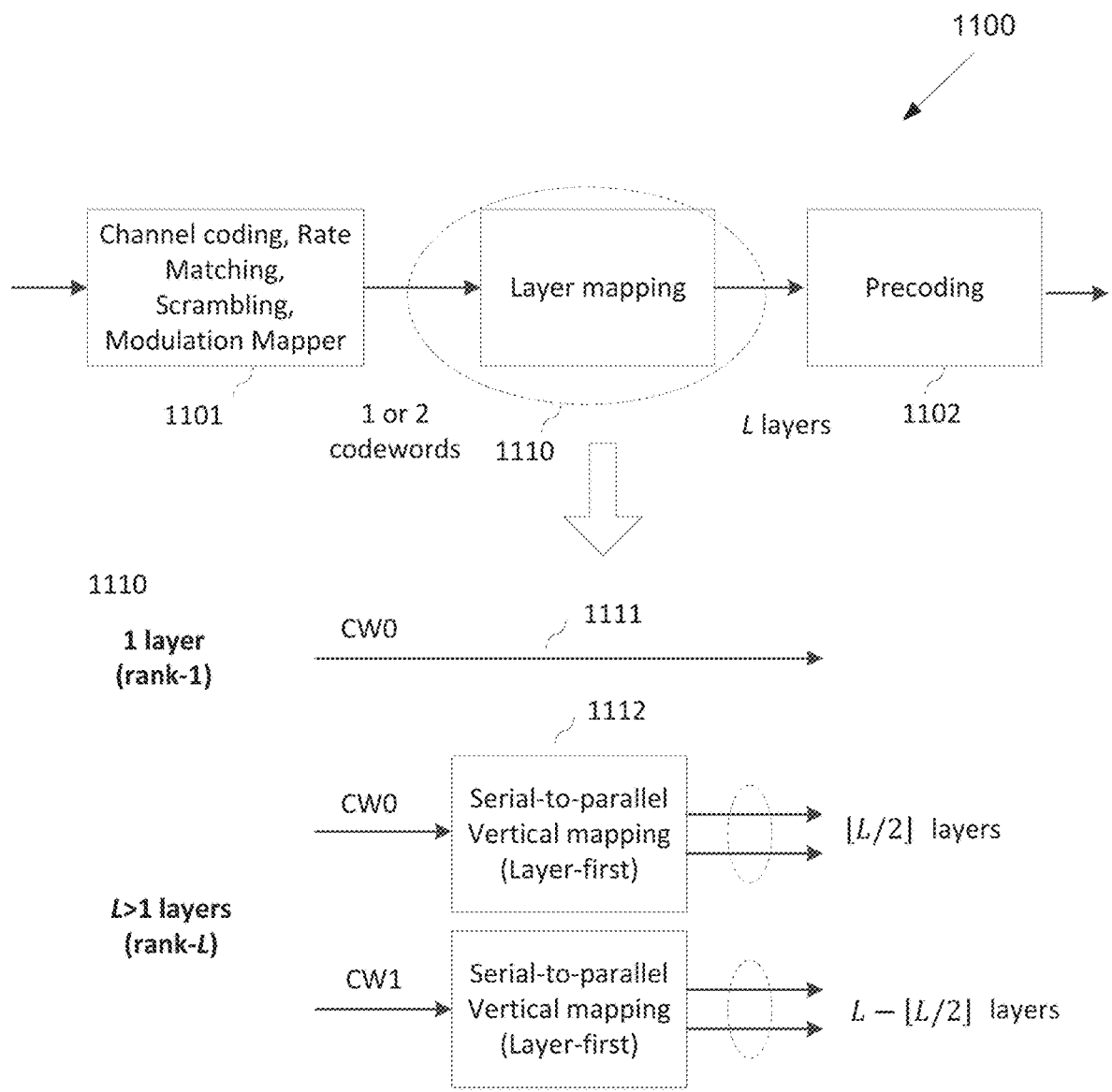
FIG. 11A illustrates an example transmission layer according to embodiments of the present disclosure.

FIG. 11A illustrates an example transmission layer 1100 according to embodiments of the present disclosure. The embodiment of the transmission layer 1100 illustrated in FIG. 11A is for illustration only. FIG. 11A does not limit the scope of this disclosure to any particular implementation.

In an LTE system, depending on the number of transmission layers, a maximum of two code words are used for DL and UL data transmissions (on DL data channel such as PDSCH or PDCH, and UL data channel such as PUSCH or PUCH, respectively) for spatial multiplexing as illustrated in FIG. 11A.

As shown in FIG. 11A, taking the output of the modulation mapper 1101 (that maps the bit stream(s) generated by channel coding, rate matching, and scrambling), layer mapping 1110 maps 1 or 2 codeword(s) to L layers before precoding 1102. For L=1, one codeword is mapped to one layer 1111. For L>1, each of the two codewords is mapped to at least one layer 1112 where L layers are divided almost evenly across the two codewords. In addition, one codeword can also be mapped to >1 layers especially when only one of the two codewords is to be retransmitted.

Figure 11B:
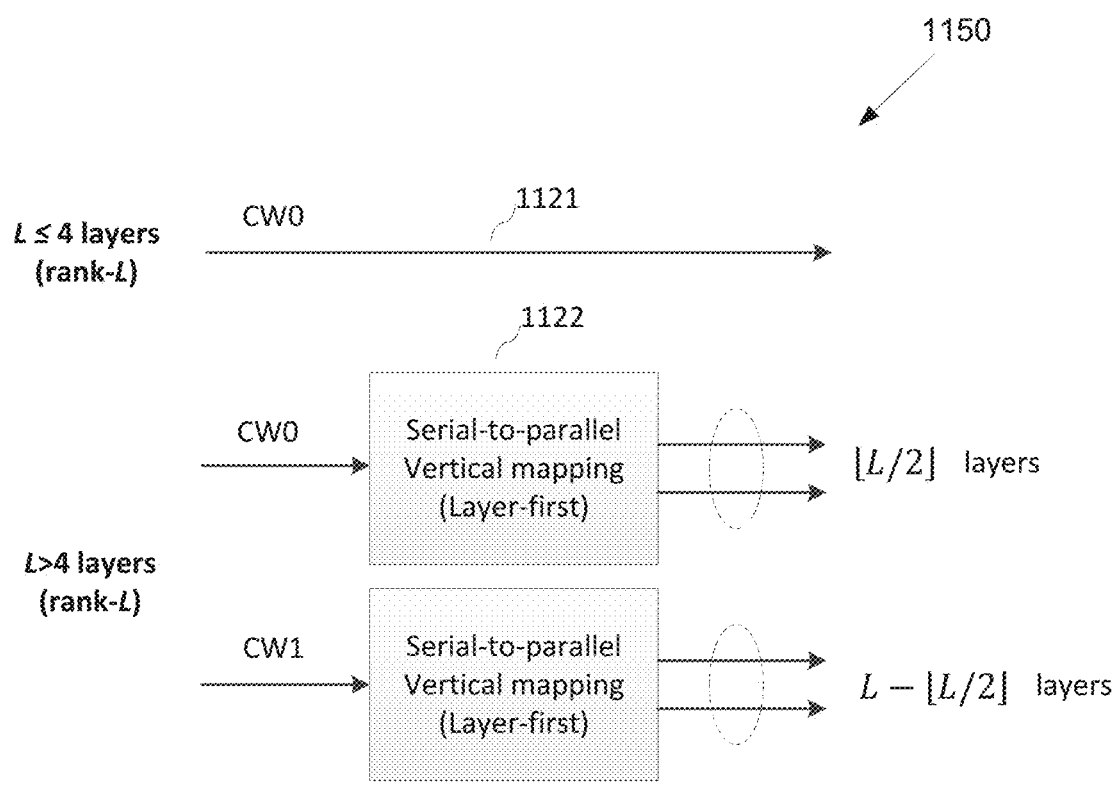
FIG. 11B illustrates another example transmission layer according to embodiments of the present disclosure.

FIG. 11B illustrates another example transmission layer 1150 according to embodiments of the present disclosure. The embodiment of the transmission layer 1150 illustrated in FIG. 11B is for illustration only. FIG. 11B does not limit the scope of this disclosure to any particular implementation.

In one embodiment, when a number of layers is four or smaller, one codeword is used while when a number of layers is larger than four, two codewords are used. This is illustrated in FIG. 11B where layer mapping 1120 maps 1 or 2 codeword(s) to L layers before precoding 1102. For L≤4, one codeword is mapped to L layers 1121. For L>4, each of the two codewords is mapped to at least two layers 1122 where L layers are divided almost evenly across the two codewords.

Although beneficial for facilitating modulation-and-coding-scheme (MCS) adaptation per codeword (CW) and MMSE-SIC (MMSE with successive interference cancellation) receiver, transmission of multiple CWs requires significant DL and UL overhead over a single CW mapping. DL overhead is due to the additional DCI payload associated with 2 fixed MCS fields and 2 fixed NDI-RV (DL HARQ related) fields. UL overhead is due to the need for reporting for two CQIs (full 4-bit+delta 3-bit for wideband CQI, and 2× overhead for subband CQI) for rank >1 and two DL HARQ-ACKs for rank >1. Added to that is the complexity of having to accommodate more than one layer mapping schemes in case of retransmission.

Furthermore, when distributed MIMO such as non-coherent joint transmission (NC-JT) is incorporated into design requirements for 5G NR, the number of codewords (CWs) used for DL and UL transmissions per UE can increase with the number of TRPs. Therefore, considering the above new challenges for 5G NR systems, there is a need for an improved codeword-to-layer mapping (also referred to as "layer mapping") with a single CW per UE for both DL and UL—along with associated signaling support.

The present disclosure includes at least two components: transmission (which includes multi-TRP support, code block segmentation, and layer mapping) and signaling support. Each of the two components can be used individually (without the other component) or in conjunction with at least one of the other component. Likewise, each of the two components includes a plurality of sub-components. Each of the sub-components can be used individually (without any other sub-component) or in conjunction with at least one of the other sub-components.

In one embodiment 1, for DL signaling scheduling for DL reception by a UE, a two-level DL-related DCI (downlink control information), namely $DCI_1$ and $DCI_2$, is configured to schedule N≥1 codewords (CWs) for DL reception. $DCI_1$ includes one MCS (modulation and coding scheme) field and one HARQ-related parameter set (such as new data indicator (NDI) and/or redundancy version (RV), including their possible variations for supporting CB-group-level HARQ) associated with a PDSCH (or, in general, DL data channel) assignment per UE based on transmission of a single CW. In addition, $DCI_1$ includes a B-bit field additionalCW that indicates the absence or presence of $DCI_2$, or the number of (N−1) additional CWs. Therefore, $B=\lceil \log_2(N) \rceil$ in order to indicate up to N−1 additional CWs or no additional CWs, that is, a number from 0 to N−1.

When $DCI_2$ is absent, DL reception is based on 1-CW per PDSCH (or, in general, DL data channel) assignment per UE. When $DCI_2$ is present, the $DCI_2$ includes N−1 additional MCS fields and N−1 additional HARQ-related parameter sets (such as NDI and/or RV), including their possible variations for supporting CB-group-level HARQ) associated with a PDSCH (or, in general, DL data channel) assignment per UE based on additional N−1 CWs. Therefore, while the payload of $DCI_1$ is fixed once configured (for example, via higher-layer signaling, either explicitly or implicitly via some other higher-layer parameter settings), the payload of $DCI_2$ can vary dynamically depending on the value of additionalCW. The total number of CWs and the payload of $DCI_2$ can then be inferred by the UE after $DCI_1$ is received and decoded.

Therefore, one PDSCH (or, in general, DL data channel) for a UE includes either one DCI (with MCS and HARQ-related information associated with one CW) or two DCIs (with MCS and HARQ-related information associated with N CWs).

If CB-level or CB-group-level HARQ is supported, multiple sets of HARQ-related parameters can be included in either both or one of DL-related $DCI_1$ and $DCI_2$ when $DCI_2$ is present. In one example 1A, B=1 and the field additionalCW=0, indicates the absence of $DCI_2$ and additionalCW=1 indicates the presence of $DCI_2$ for 1 additional CW. In another example 1B, B=1 and the field additionalCW=1, indicates the absence of $DCI_2$ and additionalCW=0 indicates the presence of $DCI_2$ for 1 additional CW. Yet another example 1C, B=2 and the field additionalCW=00 indicates the absence of $DCI_2$, additionalCW=01 indicates the presence of $DCI_2$ for 1 additional CW, additionalCW=10 indicates the presence of $DCI_2$ for 2 additional CWs, and additionalCW=11 indicates the presence of $DCI_2$ for 3 additional CWs. In yet another example 1D, B=2 and other permutations to map the DCI field additionalCW={00, 01, 10, 11} to number of additional CWs {$DCI_2$ is absent, $DCI_2$ is present for 1 additional CW, $DCI_2$ is present for 2 additional CWs, $DCI_2$ is present for 3 additional CWs} can be indicated.

Figure 12:
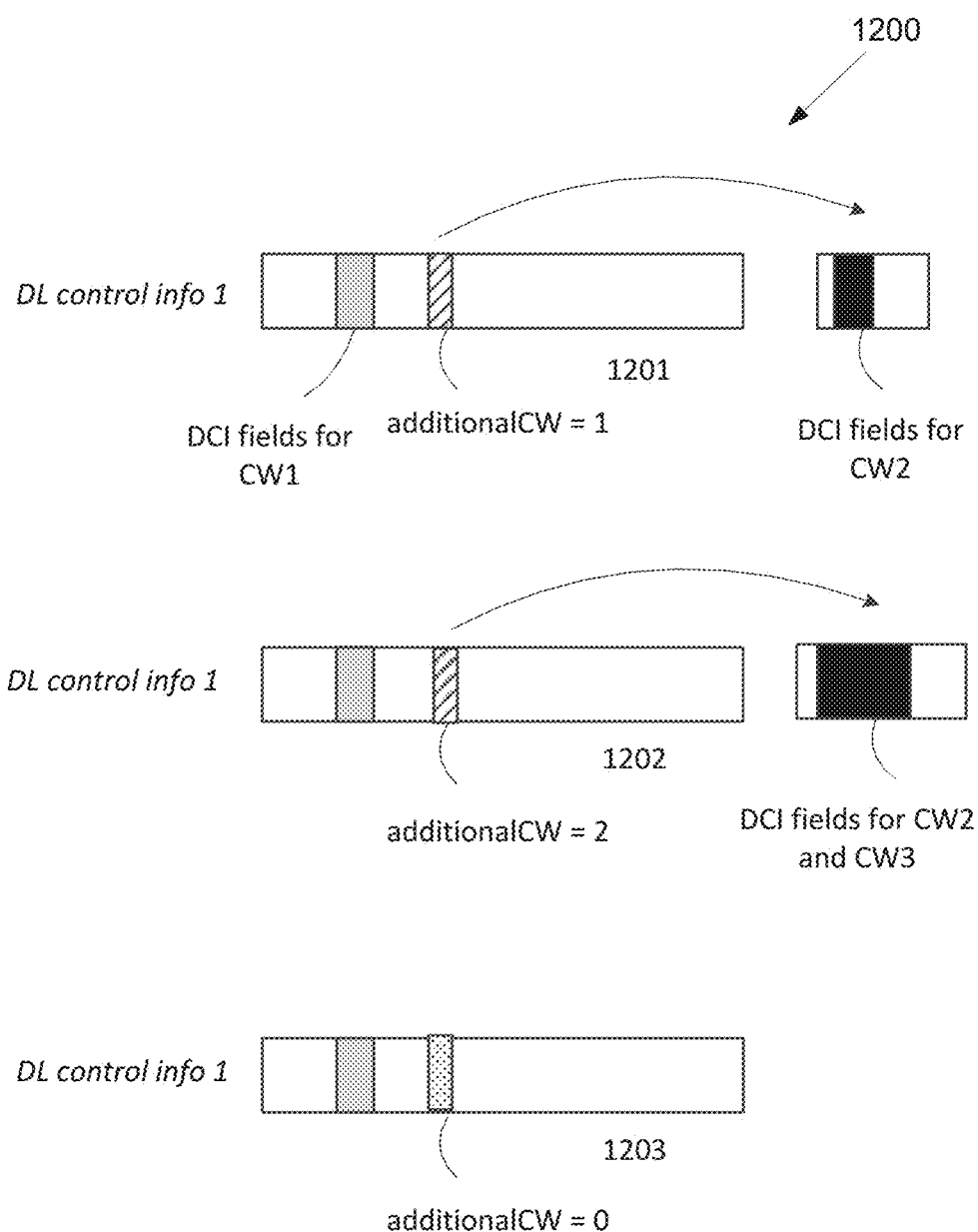
FIG. 12 illustrates an example DCI field of DL control information according to embodiments of the present disclosure.

FIG. 12 illustrates an example DCI field of DL control information 1200 according to embodiments of the present disclosure. The embodiment of the DCI field of DL control information 1200 illustrated in FIG. 12 is for illustration only. FIG. 12 does not limit the scope of this disclosure to any particular implementation.

As shown in FIG. 12, the DL control information (referred to as DL control info 1) includes the DCI fields for CW1 ($DCI_1$), shown in grey, and the field additionalCW. Three examples are proved for additionalCW. In example 1201, the field additionalCW=1 (01 in binary) indicates the presence of the DCI field ($DCI_2$) for CW2. In example 1202, the field additionalCW=2 (10 in binary) indicates the presence of the DCI field ($DCI_2$) for CW2 and CW3. In example 1203, the field additionalCW=0 (00 in binary) indicates the absence of the DCI field ($DCI_2$).

In one embodiment 2, for DL signaling for UL transmission, a two-level UL-related DCI, namely $DCI_1$ and $DCI_2$, is configured to schedule N≥1 codewords (CW) for UL transmission, wherein $DCI_1$ includes one MCS field and one HARQ-related parameter set (such as NDI and/or RV, including their possible variations for supporting CB-group-level HARQ) for a PUSCH (or, in general, UL data channel) assignment per UE based on scheduling of one CW. In addition, $DCI_1$ includes an additionalCW field of $B=\lceil \log_2(N) \rceil$ bits to indicate the absence or presence of $DCI_2$, or the number of (N−1) additional CWs.

When $DCI_2$ is absent, UL transmission is based on one CW per PUSCH (or, in general, UL data channel) assignment per UE. When $DCI_2$ is present, the $DCI_2$ includes N−1 additional MCS fields and N−1 additional HARQ-related parameter sets (such as NDI and/or RV, including their variations for supporting CB-group-level HARQ) associated with a PUSCH (or, in general, UL data channel) assignment per UE based on additional N−1 CWs. Therefore, while the payload of $DCI_1$ is fixed once configured (for example, via higher-layer signaling, either explicitly or implicitly via some other higher-layer parameter settings), the payload of $DCI_2$ can vary dynamically depending on the value of additionalCW. The total number of CWs and the payload of $DCI_2$ can then be inferred by the UE after $DCI_1$ is received and decoded. Therefore, one PUSCH (or, in general, UL data channel) for a UE includes either one DCI (with MCS and HARQ-related information associated with one CW) or two DCIs (with MCS and HARQ-related information associated with N CWs).

If CB-level or CB-group-level HARQ is supported, multiple sets of HARQ-related parameters can be included in either both or one of UL-related $DCI_1$ and $DCI_2$ when $DCI_2$ is present. The aforementioned examples 1A, 1B, 1C, and 1D in the aforementioned embodiment 1 are applicable to the aforementioned embodiment 2 also.

In one embodiment 3, for DL signaling for DL reception, a N-level DL-related DCI, namely $DCI_1, \ldots, DCI_N$, is configured to schedule N≥1 codewords (CW) for DL reception, wherein $DCI_1$ includes one MCS field and one HARQ-related parameter set (such as NDI and/or RV, including their possible variations for supporting CB-group-level HARQ) associated with a PDSCH (or, in general, DL data channel) assignment per UE based on one CW. In addition, $DCI_1$ includes an additionalCW field of $B=\lceil \log_2(N) \rceil$ bits to indicate the absence or presence of $DCI_2, \ldots, DCI_N$, or the number of (N−1) additional CWs. When $DCI_2, \ldots, DCI_N$ are absent, DL reception is based on one CW per PDSCH (or, in general, DL data channel) assignment per UE.

When $DCI_2, \ldots, DCI_N$ are present, each of $DCI_2, \ldots, DCI_N$ includes one MCS field and one HARQ-related parameter set (such as NDI and/or RV, including their variations for supporting CB-group-level HARQ) associated with a PDSCH (or, in general, DL data channel) assignment per UE based on additional N−1 CWs. Therefore, while the payload of $DCI_1$ is fixed once configured (for example, via higher-layer signaling, either explicitly or implicitly via some other higher-layer parameter settings) and the payload of each one of $DCI_2, \ldots, DCI_N$ is also fixed if $DCI_2, \ldots, DCI_N$ are present, the number of additional CWs can vary dynamically depending on the value of additionalCW. The total number of CWs can then be inferred by the UE after $DCI_1$ is received and decoded. Therefore, one PDSCH (or, in general, DL data channel) for a UE includes either one DCI (with MCS and HARQ-related information associated with one CW) or N DCIs (with MCS and HARQ-related information associated with N CWs).

If CB-level or CB-group-level HARQ is supported, multiple sets of HARQ-related parameters can be included in either some of or all of DL-related $DCI_1, \ldots, DCI_N$ when $DCI_2, \ldots, DCI_N$ are present. The aforementioned examples such as the aforementioned examples 1A, 1B, 1C, and 1D in the aforementioned embodiment 1 are applicable to the aforementioned embodiment 3 also.

In one embodiment 4, for DL signaling for UL transmission, a N-level UL-related DCI, namely $DCI_1, \ldots, DCI_N$, is configured to schedule N≥1 codewords (CW) for UL transmission, wherein $DCI_1$ includes one MCS field and one HARQ-related parameter set (such as NDI and/or RV, including their possible variations for supporting CB-group-level HARQ) associated with a PUSCH (or, in general, UL data channel) assignment per UE based on one CW. In addition, $DCI_1$ includes an additionalCW field of $B=\lceil\log_2(N)\rceil$ bits to indicate the absence or presence of $DCI_2, \ldots, DCI_N$, or the number of (N−1) additional CWs. When $DCI_2, \ldots, DCI_N$ are absent, UL transmission is based on one CW per PUSCH (or, in general, UL data channel) assignment per UE. When $DCI_2, \ldots, DCI_N$ are present, each of $DCI_2, \ldots, DCI_N$ includes one MCS field and one HARQ-related parameter set (such as NDI and/or RV, including their variations for supporting CB-group-level HARQ) associated with a PUSCH (or, in general, UL data channel) assignment per UE based on additional N−1 CWs.

Therefore, while the payload of $DCI_1$ is fixed once configured (for example, via higher-layer signaling, either explicitly or implicitly via some other higher-layer parameter settings) and the payload of each one of $DCI_2, \ldots, DCI_N$ is also fixed. If $DCI_2, \ldots, DCI_N$ are present, the number of additional CWs can vary dynamically depending on the value of additionalCW. The total number of CWs can then be inferred by the UE after $DCI_1$ is received and decoded. Therefore, one PUSCH (or, in general, UL data channel) for a UE includes either one DCI (with MCS and HARQ-related information associated with one CW) or N DCIs (with MCS and HARQ-related information associated with N CWs).

If CB-level or CB-group-level HARQ is supported, multiple sets of HARQ-related parameters can be included in either some of or all of UL-related $DCI_1, \ldots, DCI_N$ when $DCI_2, \ldots, DCI_N$ are present. The aforementioned examples such as the aforementioned examples 1A, 1B, 1C, and 1D in the aforementioned embodiment 1 are applicable to the aforementioned embodiment 4 also.

In one embodiment 5, when a presence of additional N−1 CWs is indicated using an additionalCW field in $DCI_1$, the MCS and HARQ-related parameters for additional N−1 CWs are signaled or configured via mechanisms other than additional DCIs (as in the aforementioned embodiments 1-4). For example, each MCS can be same as in $DCI_1$ for scheduling a single CW. For example, a NDI/RV can be same as in $DCI_1$ for scheduling a single CW. Further, in order to support retransmissions, the additionalCW field can be a bit-map of N bits to indicate CWs that are being scheduled by $DCI_1$. For example, for a maximum of two CWs, the additionalCW field can be a bit-map of two bits with a value of "00" indicating scheduling of both CWs, a value of "01" indicating scheduling of only a first CW, a value of "10" indicating scheduling of one a second CW, and a value of "11" being reserved/unused.

For all the aforementioned embodiments, the parameter name additionalCW is used for illustrative purposes. Another name which represents the same functionality (that is, to indicate the presence of at least one additional CW assigned to a UE) can also be used. Optionally, instead of using additionalCW (which denotes the number of additional CWs), a DCI field parameter NumberCW which denotes the total number of CWs can be used.

In one embodiment 6, the location of $DCI_2$ (which includes information pertaining to the additional N−1 CWs) (as noted in embodiment 1-2) or $DCI_2, \ldots, DCI_N$ (as noted in embodiment 3-4) can be determined implicitly. For instance, the beginning of and/or the DL control signaling resources (for example, the number of REGs) occupied by the additional DCI(s) is (are) determined based on a function of at least UE-ID, and number of REGs occupied by the DCI(s) is determined based on blind decoding, e.g. between 2, 4 and 8 REGs.

Alternatively, the location of $DCI_2$ (which includes information pertaining to the additional N−1 CWs) (as noted in embodiment 1-2) or $DCI_2, \ldots, DCI_N$ (as noted in embodiment 3-4) can be signaled explicitly. In one example, this explicit signaling can be included in $DCI_1$. In another example, this explicit signaling can be via other signaling mechanism whose relevant information is signaled in $DCI_1$. In another example, this information is signaled to the UE via higher-layer signaling (RRC) or MAC CE.

In one embodiment 7, $DCI_1$ and $DCI_2$ (as noted in embodiment 1-2) or $DCI_1$ and $DCI_2, \ldots, DCI_N$ (as noted in embodiment 3-4) are located in the same slot. Alternatively, $DCI_1$ and $DCI_2$ (as noted in embodiment 1-2) or $DCI_1$ and $DCI_2, \ldots, DCI_N$ (as noted in embodiment 3-4) are located in two slots of the same slot/subframe. Alternatively, $DCI_1$ and $DCI_2$ (as noted in embodiment 1-2) or $DCI_1$ and $DCI_2, \ldots, DCI_N$ (as noted in embodiment 3-4) are located in two slots of the two different slot/subframes.

In one embodiment 8, a resource allocation (assigned RBs) for a PDSCH assignment with multiple CWs is according to at least one of the following alternatives. In one example of Alt 8-0, the resource allocation for the PDSCH assignment is common for the CWs, i.e., DL receptions of multiple CWs overlap completely. In this case, the resource allocation information is included only in the first DCI ($DCI_1$).

In another example of alt 8-1, the resource allocation for the PDSCH assignment for the CWs partially overlap, i.e., only a subset of the assigned RBs is common between some or all CWs. In this case, the second DCI ($DCI_2$, cf. Embodiment 1) includes either resource allocation information pertaining to the additional N−1 CWs or a form of differential resource allocation information for the additional N−1 CWs relative to that to the first CW. Alternatively, $DCI_2, \ldots, DCI_N$ (cf. Embodiment 3) respectively include either resource allocation information pertaining to the additional N−1 CWs or a form of differential resource allocation information for the additional N−1 CWs relative to that to the first CW.

In another example of alt 8-2, the resource allocation for the PDSCH assignment is independent among the CWs, i.e., DL reception from multiple CWs do not necessarily overlap. For instance, the CWs can be in a same slot/subframe but in non-overlapping, or generally independent, RBs or in different slots/subframes. In this case, the second DCI ($DCI_2$, cf. embodiment 1) includes resource allocation information pertaining to the additional N−1 CWs. It is also possible that DCI₁ and DCI₂ are a same DCI having potentially different contents to independently schedule transmission of a first CW and a second CW, respectively. Then, the DCI can also include a CWindicator field to indicate an associated scheduled CW. For example, for a maximum of two CWs, the CWindicator field can include one bit.

Similarly, DCI₂, ..., DCI_N (cf. embodiment 3) respectively include resource allocation information pertaining to the additional N−1 CWs. It is also possible that DCI₁ and DCI₂, ..., DCI_N are a same DCI having potentially different contents to independently schedule transmission of a first CW and an additional (N−1) CWs, respectively. Then, the DCI can also include a CWindicator field to indicate an associated scheduled CW. For example, for a maximum of N CWs, the CWindicator field can include $\lceil \log_2(N) \rceil$ bits.

In one embodiment 9, the resource allocation (assigned RBs) for a PUSCH assignment with multiple CWs is according to at least one of the following alternatives. In one example of alt 9-0, the resource allocation for the PUSCH assignment is common for the CWs, i.e., UL transmission from multiple CWs overlap completely. In this case, resource allocation information is included only in the first DCI (DCI₁).

In another example of alt 9-1, the resource allocation for the PUSCH assignments for the CWs partially overlap, i.e., only a subset of the assigned RBs is common between some or all CWs. In this case, the second DCI (DCI₂, cf. embodiment 2) includes either resource allocation information pertaining to the additional N−1 CWs or a form of differential resource allocation information for the additional N−1 CWs relative to that to the first CW. Alternatively, DCI₂, ..., DCI_N (cf. Embodiment 4) respectively include either resource allocation information pertaining to the additional N−1 CWs or a form of differential resource allocation information for the additional N−1 CWs relative to that to the first CW.

In another example of alt 9-2, the resource allocation for the PUSCH assignment is separate for the CWs, for example, UL transmission from multiple CWs does not overlap. For instance, the CWs can be in a same slot/subframe and in non-overlapping RBs or in different slots/subframes. In this case, the second DCI (DCI₂, cf. Embodiment 2) includes resource allocation information pertaining to the additional N−1 CWs. Alternatively, DCI₂, ..., DCI_N (cf. Embodiment 4) respectively include resource allocation information pertaining to the additional N−1 CWs.

In one embodiment, the MCS and HARQ-related information for the additional N−1 CWs, if any, are signaled via DL data channel (analogous to LTE PDSCH) wherein the transmission parameters of the data channel (such as location, MCS, resource allocation, and/or the number of layers) are included in the first DCI. That is, only one DCI is used per PDSCH/PUSCH assignment per UE. This DCI includes additionalCW and, when additionalCW>0, a secondary DL control signaling is transmitted via the DL data channel instead of via a DL control channel. For example, the secondary control signaling can be located in a predetermined region of the time-frequency resources allocated by the first DCI for the DL data channel transmission such as in the first one or more symbols in time and starting from the lowest PRB index in frequency.

In another embodiment, the MCS in the first DCI denotes the assigned MCS for the first CW. For the remaining N−1 CWs, differential MCS relative to the MCS of the first CW can be used for each of those remaining CWs. In this case, the number of bits used for a differential MCS field can be smaller than that used for the first MCS (in the first DCI).

In one embodiment 10, a UE configured with a single DCI (DL-related for DL data reception or UL-related UL data transmission) including information about the number of CWs (N), which is indicated by an additionalCW field of $B=\lceil \log_2(N) \rceil$ bits in the DCI. The number of CWs (N) is variable and the number of bits per CW (to indicate fields related to MCS and HARQ related parameter sets (NDI and/or RV) decreases as the number of CWs (N) increases such that the total payload of the DCI transmission remains the same.

In one embodiment 11, a UE configured with a single DCI (DL-related for DL data reception or UL-related UL data transmission) including an information about the number of CWs (N), which is indicated by an additionalCW field of $B=\lceil \log_2(N) \rceil$ bits in the DCI. The number of CWs (N) is variable. For the first CW, the information fields for MCS and HARQ related parameter sets (NDI and/or RV) are included in the DCI. For additional (N−1) CWs, the information fields for MCS and HARQ related parameter sets (NDI and/or RV) are transmitted together with data transmission in the same slot/subframe.

In a variation of the aforementioned embodiments, if the number of CWs (N) is greater than 1, the information fields for MCS and HARQ related parameter sets (NDI and/or RV) for N CWs are signaled in two sets, set 1 and set 2. Set 1 is signaled via the DCI and set 2 is signaled together with data transmission in the same slot/subframe.

Figure 13:
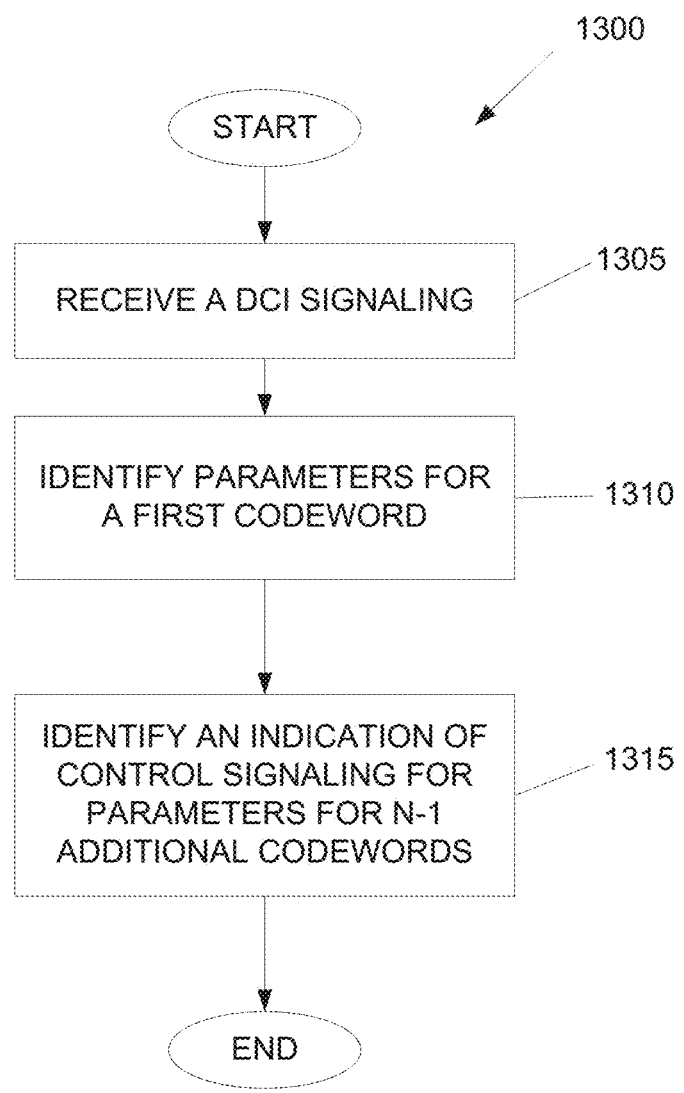
FIG. 13 illustrates a flow chart of a method for control signaling for multi-stream transmission according to embodiments of the present disclosure.

FIG. 13 illustrates a flow chart of a method 1300 for control signaling for multi-stream transmission according to embodiments of the present disclosure. The method 1300 may be performed by a UE, such as UE 116 for example, according to embodiments of the present disclosure. The embodiment of the method 1300 illustrated in FIG. 13 is for illustration only. FIG. 13 does not limit the scope of this disclosure to any particular implementation.

The method starts with the UE 116 receiving a DCI signaling (step 1305). For example, the UE may receive the DCI signaling from a BS such as BS 102. The UE 116 then identifies parameters for a first codeword (step 1310) For example, in step 1310, the UE identifies the parameters for the first codeword from the DCI signaling. For example, the parameters for the first codeword can include one MCS parameter and one HARQ-related parameter set such as a NDI or a RV.

The UE 116 also identifies an indication of control signaling for parameters for N−1 additional codewords (step 1315) For example, in step 1315, the UE identifies the indication of control signaling for parameters for N−1 additional codewords from the DCI signaling, where N is a number of codewords scheduled for the UE and N≥1. For example, the N codewords scheduled for the UE corresponds to the N codewords scheduled for either DL data reception by the UE via a PDSCH or UL data transmission by the UE via PUSCH. For example, the parameters for the N−1 additional codewords can include one MCS parameter and one HARQ-related parameter set such as a NDI or a RV for each of the N−1 additional codewords.

In various embodiments, the DCI signaling received in step 1305 is a first level DCI having a fixed size S1>0 and the indication of the control signaling for the parameters for the N−1 additional codewords identified in step 1310 indicates whether a second level DCI (or additional N levels of DCI) having a variable size S2≥0 is present. Here, S1 and S2 correspond to number of bits for the first and second level DCIs, S2=0 corresponds to N=1 and indicates that the second level DCI is absent, and S2>0 corresponds to N>1 and indicates that the second level DCI is present.

In some embodiments, the indication of the control signaling for the parameters for the N−1 additional codewords includes a B-bit field NumberCW, where B=$\lceil \log_2 N \rceil$. The B-bit field NumberCW has a value (e.g., binary value) indicating the presence or absence of the N−1 additional codewords. In some embodiments, the DCI signaling is received in a PDCCH while the control signaling for the parameters for the N−1 additional codewords is received in a PDSCH, for example, multiplexed with data. In various embodiments, the UE 116 can determine a location of the control signaling for the parameters for the N−1 additional codewords explicitly (e.g., based on signaling received by the UE 116) or implicitly.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
   a transceiver configured to receive a downlink (DL) control information (DCI) signaling, wherein the DCI signaling is a first level DCI and is received in a first channel; and
   a processor operably connected to the transceiver, the processor configured to identify, from the DCI signaling, parameters for a first codeword and an indication of whether a second level DCI including control signaling for parameters for N−1 additional codewords is present in a second channel,
   wherein N is a number of codewords scheduled for the UE and N≥1.

2. The UE of claim 1, wherein:
   the first level DCI has a fixed size S1>0,
   the second level DCI has a variable size S2>0,
   S1 and S2 correspond to number of bits for the first and second level DCIs,
   S2=0 indicates that the second level DCI is absent, and
   S2>0 corresponds to N>1 and indicates that the second level DCI is present.

3. The UE of claim 1, wherein the indication of the control signaling for the parameters for the N−1 additional codewords comprises a B-bit field, NumberCW, having a value indicating a presence or an absence of the N−1 additional codewords, where B=$\lceil \log_2(N) \rceil$.

4. The UE of claim 1, wherein:
   the DCI signaling is received in the first channel that is a physical DL control channel (PDCCH), and
   the control signaling for the parameters for the N−1 additional codewords is received in the second channel that is a physical DL shared channel (PDSCH).

5. The UE of claim 1, wherein:
   the parameters for the first codeword comprise one modulation and coding scheme (MCS) parameter and one hybrid ARQ (HARD)-related parameter set including at least one of a new data indicator (NDI) and a redundancy version (RV), and
   the parameters for the N−1 additional codewords comprise one MCS parameter and one HARQ-related parameter set including at least one of a NDI and a RV for each of the N−1 additional codewords.

6. The UE of claim 1, wherein:
   the DCI signaling is received in the first channel that is a first physical DL control channel (PDCCH), and
   the control signaling for the parameters for the N−1 additional codewords is received in the second channel that is a second PDCCH.

7. The UE of claim 1, wherein the processor is configured to determine the second channel to identify the control signaling for the parameters for the N−1 additional codewords based on signaling received by the transceiver.

8. A base station (BS) comprising:
   a processor configured to generate parameters for a first codeword and an indication of control signaling for parameters for N−1 additional codewords; and
   a transceiver operably connected to the processor, the transceiver configured to transmit, to a user equipment (UE), a downlink (DL) control information (DCI) signaling including the parameters for the first codeword and the indication of whether a second level DCI including the control signaling for the parameters for the N−1 additional codewords is present in a second channel,
   wherein the DCI signaling is a first level DCI and transmitted in a first channel, and
   wherein N is a number of codewords scheduled for the UE and N≥1.

9. The BS of claim 8, wherein:
   the first level DCI has a fixed size S1>0,
   the second level DCI has a variable size S2>0,
   S1 and S2 correspond to number of bits for the first and second level DCIs,
   S2=0 indicates that the second level DCI is absent, and
   S2>0 corresponds to N>1 and indicates that the second level DCI is present.

10. The BS of claim 8, wherein the indication of the control signaling for the parameters for the N−1 additional codewords comprises a B-bit field, NumberCW, having a value indicating a presence or an absence of the N−1 additional codewords, where B=$\lceil \log_2(N) \rceil$.

11. The BS of claim 8, wherein:
    the DCI signaling is transmitted in the first channel that is a physical DL control channel (PDCCH), and
    the control signaling for the parameters for the N−1 additional codewords is transmitted in the second channel that is a physical DL shared channel (PDSCH).

12. The BS of claim 8, wherein:
    the parameters for the first codeword comprise one modulation and coding scheme (MCS) parameter and one hybrid ARQ (HARD)-related parameter set including at least one of a new data indicator (NDI) and a redundancy version (RV), and
    the parameters for the N−1 additional codewords comprise one MCS parameter and one HARQ-related parameter set including at least one of a NDI and a RV for each of the N−1 additional codewords.

13. The BS of claim 8, wherein:
    the DCI signaling is transmitted in the first channel that is a first physical DL control channel (PDCCH), and
    the control signaling for the parameters for the N−1 additional codewords is transmitted in the second channel that is a second PDCCH.

14. The BS of claim 8, wherein the transceiver is configured to transmit signaling indicating the second channel including the control signaling for the parameters for the N−1 additional codewords.

15. A method for operating a user equipment (UE), the method comprising:
- receiving a downlink (DL) control information (DCI) signaling, wherein the DCI signaling is a first level DCI and is received in a first channel; and
- identifying, from the DCI signaling, parameters for a first codeword and an indication of whether a second level DCI including control signaling for parameters for N−1 additional codewords is present in a second channel, wherein N is a number of codewords scheduled for the UE and N≥1.

16. The method of claim 15, wherein:
the first level DCI has a fixed size S1>0,
the second level DCI has a variable size S2>0,
S1 and S2 correspond to number of bits for the first and second level DCIs,
S2=0 indicates that the second level DCI is absent, and
S2>0 corresponds to N>1 and indicates that the second level DCI is present.

17. The method of claim 15, wherein the indication of the control signaling for the parameters for the N−1 additional codewords comprises a B-bit field, NumberCW, having a value indicating a presence or an absence of the N−1 additional codewords, where $B=\lceil \log_2(N) \rceil$.

18. The method of claim 15, wherein:
the DCI signaling is received in the first channel that is a physical DL control channel (PDCCH), and
the control signaling for the parameters for the N−1 additional codewords is received in the second channel that is a physical DL shared channel (PDSCH).

19. The method of claim 15, wherein:
the parameters for the first codeword comprise one modulation and coding scheme (MCS) parameter and one hybrid ARQ (HARD)-related parameter set including at least one of a new data indicator (NDI) and a redundancy version (RV), and
the parameters for the N−1 additional codewords comprise one MCS parameter and one HARQ-related parameter set including at least one of a NDI and a RV for each of the N−1 additional codewords.

20. The method of claim 15, wherein:
the DCI signaling is received in the first channel that is a first physical DL control channel (PDCCH), and
the control signaling for the parameters for the N−1 additional codewords is received in the second channel that is a second PDCCH.

* * * * *